June 26, 1928.
H. L. JOHNSTON ET AL
MIXING MACHINE
Filed Dec. 1, 1922
1,674,903
2 Sheets-Sheet 1
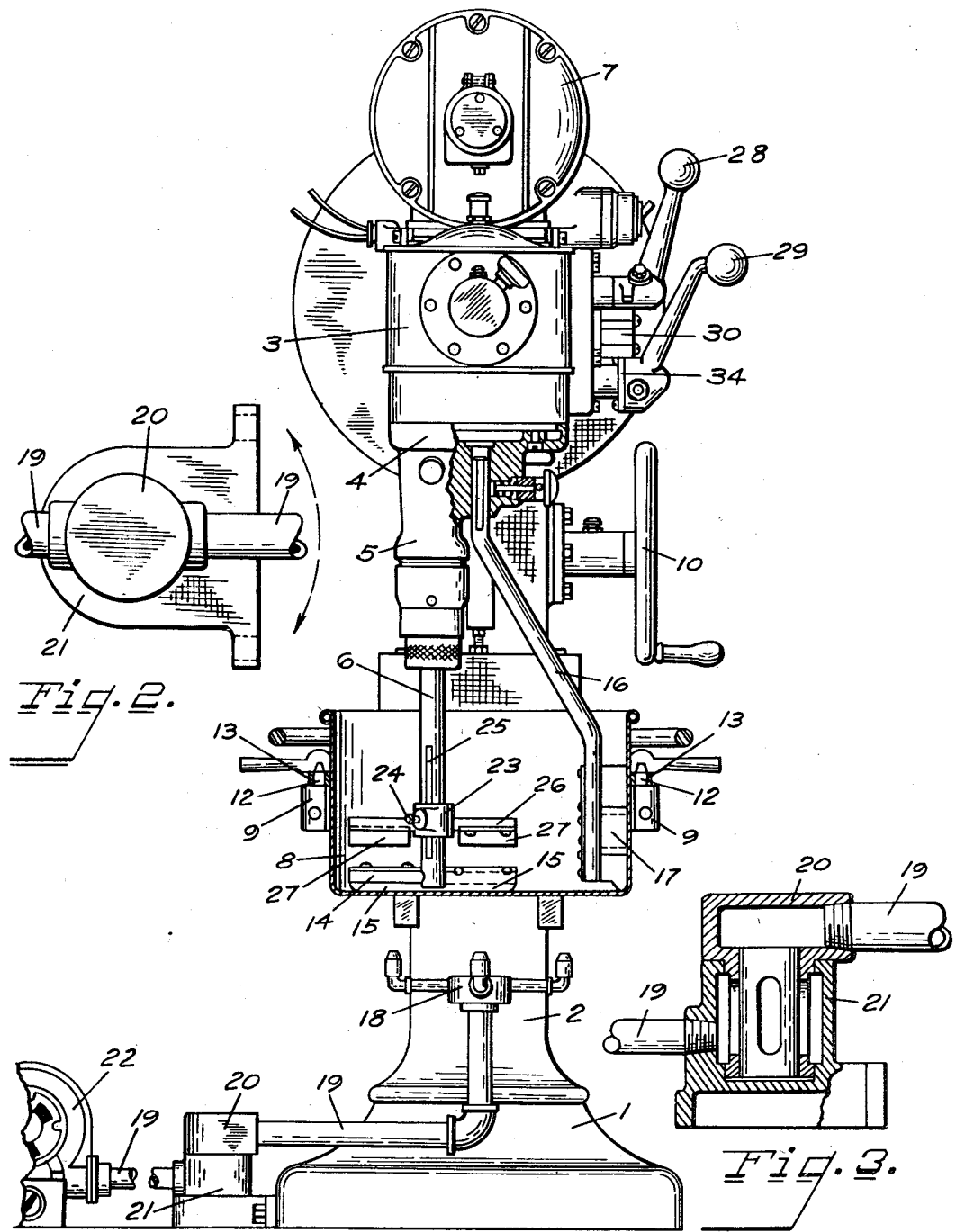

June 26, 1928.
H. L. JOHNSTON ET AL
MIXING MACHINE
Filed Dec. 1, 1922
1,674,903
2 Sheets-Sheet 2
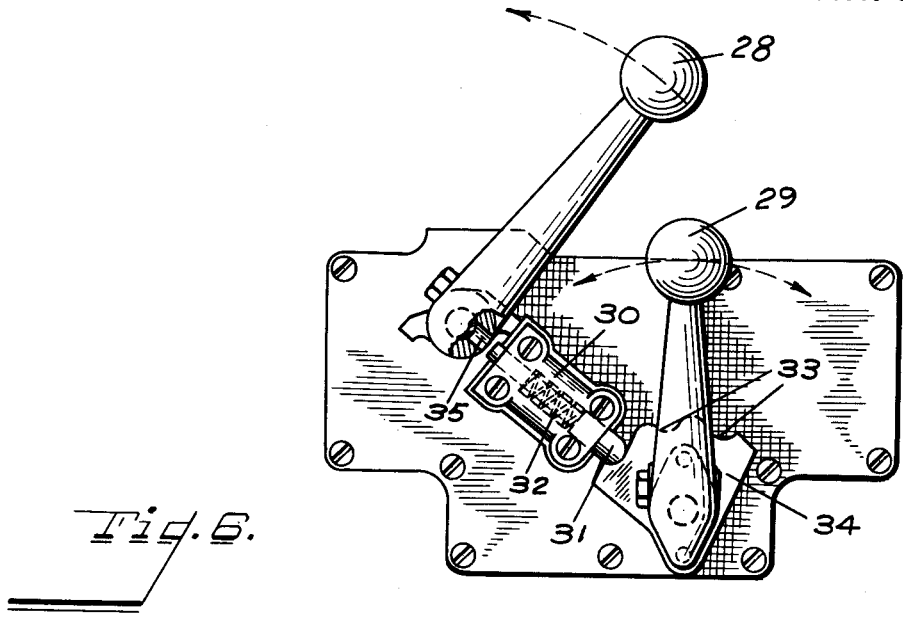
Fig. 6.
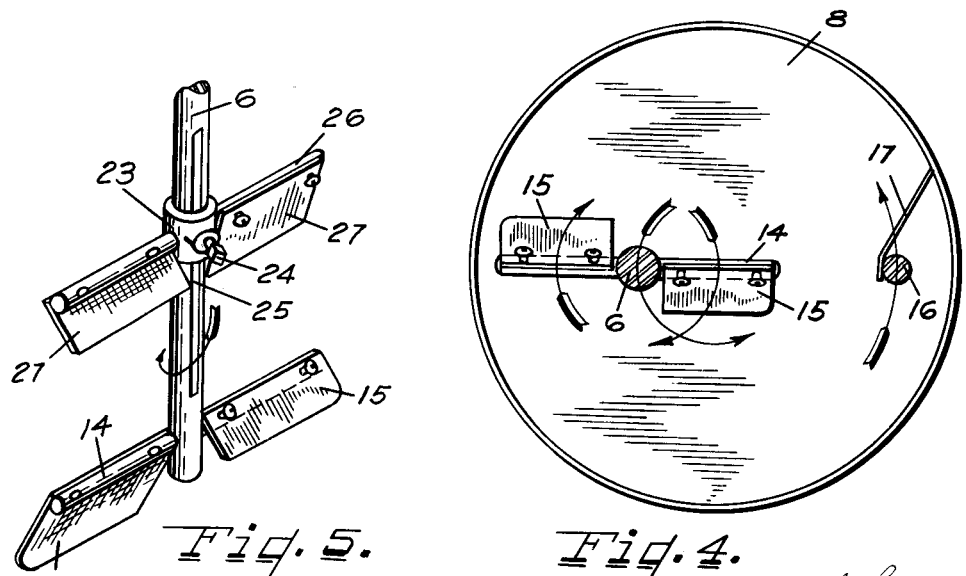
Fig. 5.
Fig. 4.
Herbert L Johnston
Thomas Rotaieszak
INVENTORS Patented June 26, 1928.

1,674,903

UNITED STATES PATENT OFFICE.

HERBERT L. JOHNSTON AND THOMAS F. RATAICZAK, OF TROY, OHIO, ASSIGNORS TO THE HOBART MANUFACTURING COMPANY, OF TROY, OHIO, A CORPORATION OF OHIO.

MIXING MACHINE.

Application filed December 1, 1922. Serial No. 604,220.

Our invention relates to improvements in motor driven mixing machines and has special relation to the adaption of such machines for the mixing of ingredients in the manufacture of candy, in which machines it is important the ingredients shall be maintained at a high temperature during the mixing operation and provision shall be made to prevent adherence of the material to the bottom and sides of the mixing bowl and burning of the contents when cooking.

It is also of importance, in the handling of such materials while cooking, that the operator shall have full control over the speed of the beaters and scrapers and for this reason we have also equipped the machine with a convenient and safe operating mechanism, whereby the various speeds may be controlled by the operating of a hand crank, which is interlocked with the clutch control devices, so as to prevent the shifting of the speed change gears except when the clutch mechanism is released.

Our invention consists therefore in that certain novel construction and arrangement of parts to be hereinafter particularly pointed out and claimed, in which the heating devices may be readily and easily applied to the mixing bowl and the contents of the bowl shall be prevented from sticking to the bowl òr burning during the mixing operation and the speed of the beaters and scrapers readily controlled.

In the drawings,

Figure 1 is a front elevation of our mixing machine with parts in vertical section.

Figure 2 is a plan view and Figure 3, a central vertical section of the gas mixer for supplying fuel to the burner.

Figure 4 is a horizontal section through the mixing bowl indicating the path of movement of the beaters and scrapers.

Figure 5 is a perspective view of the beater.

Figure 6 is a front elevation of the change of speed and clutch control operating devices.

The machine is mounted on a substantial base 1 and supporting column 2 carrying the gear casing 3, within which are mounted the various trains of gearing and change of speed devices necessary for the rotating of the planetary housing 4 depending from which eccentrically is the sleeve casing 5, in which is mounted the beater or stirrer shaft 6, which is given a rotary motion on its own axis at the same time that the planetary head is rotated on a central axis. The mechanism is driven by an electric motor 7 mounted on top of the casing and suitably geared to the driving shaft of the machine.

We have not illustrated any of this internal construction as it forms no part of the present invention and we have merely selected as illustrating the type of machine to which our invention is applied, such a machine as is more particularly shown and described in our former Patent No. 1,264,128, of April 23, 1918, without in any way desiring to be limited to such particular construction of machine.

For the convenient stirring and mixing of the candy ingredients, we provide a circular bowl 8 with a substantially flat bottom. This bowl is mounted in bowl supporting arms 9, which form a semi-circular support for the bowl and which are adapted to be raised and lowered on the column support 2 by a hand wheel 10 and interconnecting devices which are not illustrated as they form no part of the present invention. The outer ends of the bowl supporting arms carry studs 12 and the bowl is provided with ears 13, 13, one on each side which are seated on these studs 12 for holding the bowl in the support.

The beater shaft 6 is provided at its lower end with laterally projecting arms 14 to which are secured scraper blades 15 which are inclined downwardly in the direction of the rotation of the beater shaft on its own axis as indicated by the arrows in Figure 4. This rotation on its own axis of the shaft 6 and its circular movement around the axis of the planetary head causes the scraper blades to operate over the entire surface of the bottom of the bowl to prevent burning of the contents of the bowl when cooking.

Mounted on the planetary head 4 at the axis of rotation is a shaft 16 which carries at its lower end, scraper blades 17 which are inclined towards the sides of the bowl in the direction of rotation as shown in Figure 4 and are adapted to scrape the sides of the bowl, the shaft 16 as will be evident rotating only on its own axis.

In order to heat the contents of the bowl, a burner 18 is provided connected by an elbow to the supply pipe 19 which is provided with a swiveled coupling comprising members 20 and 21, with member 21 bolted to the base 1, so that the burner may be turned out from under the bowl when a supply of heat is not required. The mixture of gas and air for the burner is by preference furnished from a blower 22.

For certain kinds of candy it is desirable to provide an auxiliary set of scrapers. For this purpose a collar 23 is adjustably mounted on the shaft 6 and held in adjustable positions by the set screw 24 engaging on the slot 25 in the shaft. This collar carries projecting arms 26 to which are secured scraper blades 27 which are inclined in the opposite direction from the blades 15. These latter scrapers therefore act to depress or smooth over the material which is plowed up from the bottom and give a finer grain to the product. As their action is to rub the material downwardly, they are adjustable for the proper depth of the candy.

In order that the operator may have effective control of the speed of the scrapers, we mount intermediate the crank hubs of the two hand levers 28 and 29, which control respectively the clutch release and change of speed devices of the operating mechanism, a holder 30 secured to the casing. This holder is recessed and carries a sliding plunger 31, which is resiliently pressed by a coiled spring 32, normally to cause one end of the plunger to engage notches 33 in a plate 34, which is rigidly attached to the change of speed handle 29.

The hub of the handle 28 is provided with a hole 35 which is so located that when the clutch lever 28 is in a position in which the clutch between the driving and driven mechanism of the machine is released the hole will be in alignment with the longitudinal axis of the plunger 31 and will permit the plunger to enter the hole. When in this position the crank 29 can be turned to change the speed and the movement of the handle will cause the plunger to ride over the raised portion of the plate 34 and to enter the hole 35 and thus lock the handle 28 from movement.

When the change of speed has been made the plunger 31 will then be drawn out of the hole 35 and engage the proper notch in the plate 34, while the clutch handle can then be operated to connect the driving and driven mechanisms.

In this way the two levers are interlocked, the gear shift for change of speed cannot be made except when the clutch is released, nor can the clutch be released except when the change of speed gears are in proper position.

The failure to mention the use of mechanical equivalents in the course of the foregoing description of parts is not to be understood as any intention on our part to be limited to the exact construction shown otherwise than as may be necessary in view of the state of the art relating to such devices.

Having thus described our invention, what we claim as new and desire to secure by Letters Patent, is:—

In a mixing machine provided with planetary movement devices, a beater shaft connected therewith, and a flat bottomed mixing bowl, with the beater shaft provided with beater blades extending substantially adjacent the bowl bottom, and rotatable in a counter direction to the rotation of the mounting shaft, with the blades inclined from top to bottom toward their direction of rotation, an agitator mounted adjustably on the shaft above said first named beater blades, said agitator having blades inclined oppositely to said first mentioned blades, and a scraper shaft with a scraping portion thereof extending toward the side walls of the bowl so as to scrape the same, said shaft mounted so as to rotate about the axial center of the bowl, and being arranged in alternate position with relation to the beater shaft.

HERBERT L. JOHNSTON.
THOMAS F. RATAICZAK.